US010924562B1

(12) United States Patent
Xiao et al.

(10) Patent No.: US 10,924,562 B1
(45) Date of Patent: Feb. 16, 2021

(54) REAL-TIME MONITORING OF IO LOAD AND LATENCY

(71) Applicant: Amazon Technologies, Inc., Reno, NV (US)

(72) Inventors: Wei Xiao, Kirkland, WA (US); Kiran-Kumar Muniswamy-Reddy, Seattle, WA (US); Yijun Lu, Kenmore, WA (US); Bjorn Patrick Swift, Seattle, WA (US); Miguel Mascarenhas Filipe, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 796 days.

(21) Appl. No.: 13/886,025

(22) Filed: May 2, 2013

(51) Int. Cl.
*H04L 29/08* (2006.01)

(52) U.S. Cl.
CPC .................... *H04L 67/22* (2013.01)

(58) Field of Classification Search
CPC .......... H04L 47/10; H04L 47/70; H04L 67/32
See application file for complete search history.

(56) References Cited

U.S. PATENT DOCUMENTS

| | | | | |
|---|---|---|---|---|
| 6,836,785 B1* | 12/2004 | Bakshi | .................... | H04L 47/28 709/203 |
| 10,601,717 B2* | 3/2020 | Chan | ....................... | H04L 47/24 |
| 2004/0193397 A1* | 9/2004 | Lumb | .................... | G06F 13/105 703/24 |
| 2005/0083845 A1* | 4/2005 | Compton | ................ | H04L 47/10 370/235 |
| 2005/0102674 A1* | 5/2005 | Tameshige | ............ | G06F 9/5011 718/100 |
| 2007/0112723 A1* | 5/2007 | Alvarez | .................... | G06F 9/50 |
| 2007/0124555 A1* | 5/2007 | Zohar | ................. | G06F 12/0866 711/163 |
| 2007/0271219 A1* | 11/2007 | Agarwal | ............... | G06F 11/008 |
| 2010/0135155 A1* | 6/2010 | Sankhavaram | ....... | H04L 47/822 370/230 |
| 2010/0268798 A1* | 10/2010 | Kourkouzelis | ....... | H04L 67/325 709/220 |
| 2012/0330954 A1* | 12/2012 | Sivasubramanian | ....... | G06F 9/5061 707/737 |
| 2015/0074283 A1* | 3/2015 | Karthikeyan | ........... | H04L 45/12 709/227 |
| 2016/0285780 A1* | 9/2016 | Strijkers | ............... | H04W 88/02 |

* cited by examiner

*Primary Examiner* — Jerry B Dennison
(74) *Attorney, Agent, or Firm* — Davis Wright Tremaine LLP (57) ABSTRACT

Providers of web services and other types of software as a service may be subject to service-level agreements requiring that response times be within a defined range. For efficiency, multiple services may be hosted on the same set of computing nodes, which may jeopardize adherence to service-level agreements. A control system may involve classifying service requests and determining desired values for measurements such as latency. An error value may be calculated based on the difference between measured and desired values. A controller may adjust a rate of capacity utilization for the computing nodes based on the current error, a history of past errors, and a prediction of future errors.

25 Claims, 9 Drawing Sheets

REAL-TIME MONITORING OF IO LOAD AND LATENCY

BACKGROUND

Distributed databases, web services, hosted applications and other forms of software-as-a service may be hosted by a third-party provider that maintains data centers and other computing resources to host various services on behalf of its customers. The response time involved when these services are invoked may influence elements of the contractual relationship between the hosting provider and the customer. For example, a service-level agreement may require service response times to fall under a specified amount of elapsed time. If these agreements are not adhered to, the provider may suffer financial loss.

At the same time, it may be costly to rely on hardware and software allocated only to individual customers, or to purchase additional hardware and software resources for the sole purpose of adhering to a service-level agreement. In some cases, many of the hosted services may be inactive for various lengths of time and the excess capacity may go unused. In other cases, the service may incur peak levels of demand but generally utilize less than the capacity reserved for that customer. Ideally, hardware and software resources could be shared among customers while minimizing the risk of violating service-level agreements.

BRIEF DESCRIPTION OF DRAWINGS

The drawings provided herein are designed to illustrate example embodiments and are not intended to limit the scope of the disclosure.

DETAILED DESCRIPTION

Distributed databases, web services, hosted applications and other forms of software-as-a-service may involve service-level agreements which specify a maximum amount of time, or latency, for processing requests processed by the hosted service. The provider of the hosting service may adopt various strategies for ensuring that requests are processed within the required timeframe. One approach is to reserve a portion of computing resources exclusively for the use of the hosted service. However, this approach may be inefficient when the provider is hosting many different services. It may be the case that only a few of the hosted services are active at any one time, which in turn may cause the reserved computing resources to be underutilized most of the time. The associated waste of computing resources may involve excess expenditures related to computing hardware, software, power, facilities space and so forth. Accordingly, it may be advantageous to the provider to maximize the use of computing resources even when service-level agreements are in place.

In some cases the provider may host multiple services on a single computing node. The type of service, expected workload, usage patterns and so forth may be considered to determine the mix of services that may be hosted on a given computing node. There is, however, a risk to this approach. If no control is exercised on incoming requests for service, the activities of one customer's service may slow the response time for the other services hosted on the same computing node. This may be caused, for example, by overutilization of some aspect of the computing node, network resource and so forth. As an example, if computationally intensive operations are frequently executed, insufficient central processing unit ("CPU") cycles may be available to other services operating on the same set of computing nodes or otherwise sharing computational, network, storage or other resources.

Accordingly, one approach to addressing potential overutilization of computing resources involves throttling requests. When performance of an operation is requested, a computing process, library or other form of executing code may determine if the request should be admitted or rejected. The client application that sent the request may be notified of the rejection, and in some cases may reissue the request at a later time.

While the throttling mechanism may help prevent overutilization, it may also cause underutilization if its throttling strategy is overly aggressive. Accordingly, an ideal throttling mechanism would reject enough requests so that any existing service-level agreements are honored but not so much that computing capacity is wasted. Furthermore, the throttling mechanism could incorporate latency as a key metric. While other metrics, such as CPU utilization, network bandwidth consumption and disk queue length might be predictive of latency, the complexity of computing technology may make utilization of such metrics inaccurate under some circumstances. Accordingly, it would be advantageous to directly incorporate latency measurements into various control mechanisms such as throttling.

Figure 1:
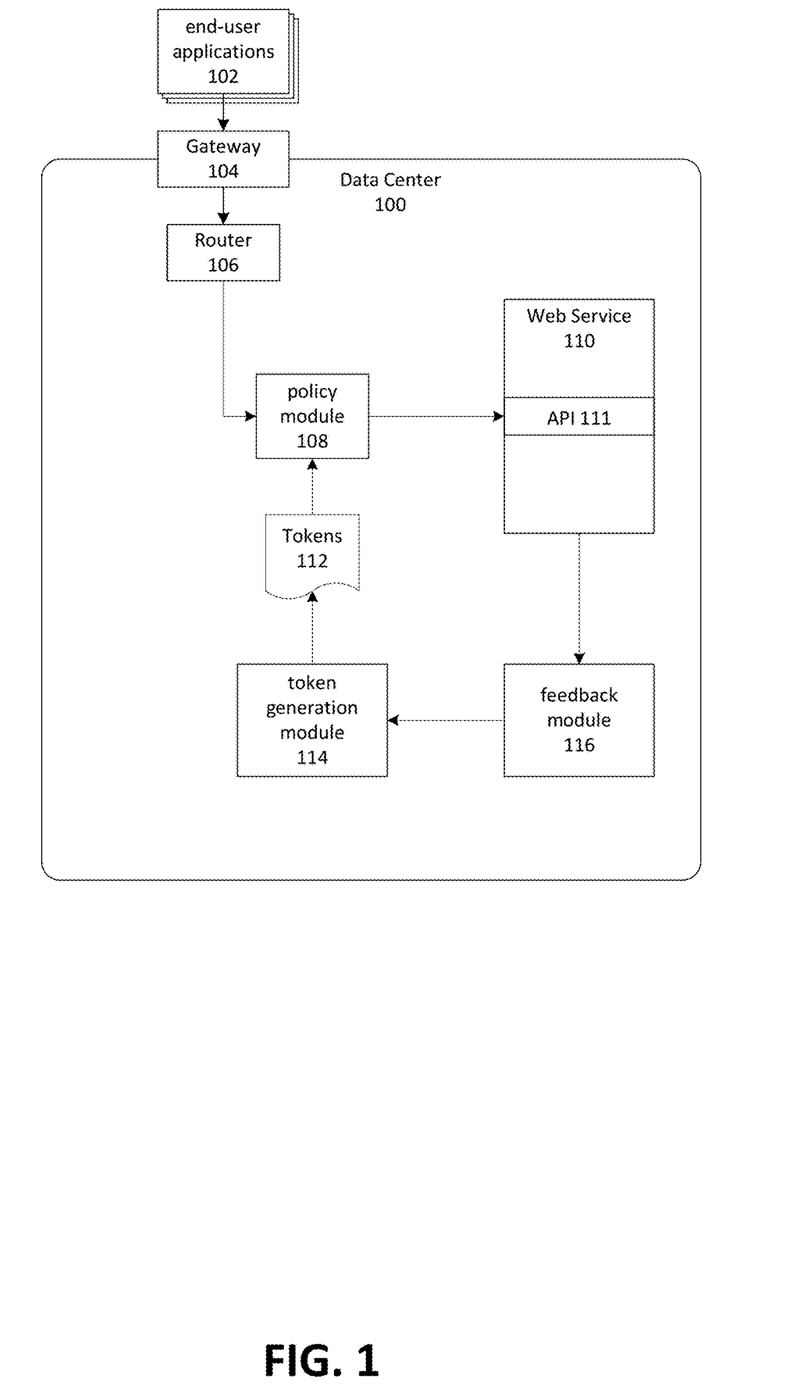
FIG. 1 is a block diagram of a data center hosting a web service and employing a mechanism to improve capacity utilization using a throttling mechanism.

FIG. 1 depicts an embodiment of a data center hosting a service and employing an associated throttling mechanism. In the depicted embodiment, a customer has contracted with the operator of data center 100 to host web service 110, having application programming interface ("API") 111, to end-user applications 102. The various end-user-applications 102 may send requests to read data, write data or perform some operation or state change on web service 110, accessed through a network connected to gateway 104 and router 106.

Policy module 108 may implement a throttling policy by accepting or rejecting requests arriving from end-user applications 102. Policy module 108 may be implemented in software, hardware or in various combinations thereof. In some embodiments, policy module 108 may be integrated into other elements depicted in FIG. 1, such as router 106, web service 110 or API 111. Although depicted in FIG. 1 as a web service and associated API, elements 110 and 111 are illustrative of a general concept and are intended to be representative of any type of service or operation.

In an embodiment, policy module 108 determines whether to accept or reject the request based on the availability of tokens 112 that are expended when requests are processed. Tokens 112 may be allocated on a per-service basis, so that when one service's tokens are expended, requests directed to that service are no longer accepted, but requests directed to other services may still be processed as long as the corresponding tokens are available. In other embodiments, tokens may be allocated on a per-customer basis, for example by allowing services controlled by the same customer to draw from a common pool of tokens.

Token generation module 114 may act to replenish the supply of tokens. In an embodiment, additional tokens are added to a service's supply of tokens based at least in part on factors such as the corresponding customer's service tier, the penalties associated with violations of a service level agreement, the number of other services running on the computing node, an amount of reserved capacity needed for running maintenance procedures and so forth.

A feedback module 116 may adjust the rate at which token generation occurs. It may, for example, collect various metrics from or concerning web service 110 and API 111, such as the latency of request processing. In general terms, feedback module 116 may incrementally adjust the rate of token generation upwards when latency is low, and incrementally adjust the rate downwards when the computing node is becoming overloaded and latency is increasing.

Because token availability influences decisions to admit or reject requests to perform operations, the rate of token generation influences the rate at which requests are admitted, which may be referred to as an admittance rate. Accordingly, feedback module 116 may influence the admittance rate by adjusted the rate at which tokens accumulate.

Throttling or other types of admission policies may involve provisioning a certain amount of capacity to each service. Capacity may be described as ability to process requests. A related concept, capacity utilization, may be described as consuming that ability. In general, capacity utilization may be viewed as affecting the ability to process requests concurrently, rather than sequentially. However, in some cases capacity may be limited by factors such as storage space, in which case capacity utilization may involve sequential processing. Provisioning capacity may allow for a regulated distribution of capacity utilization between various services and customers.

Figure 2A:
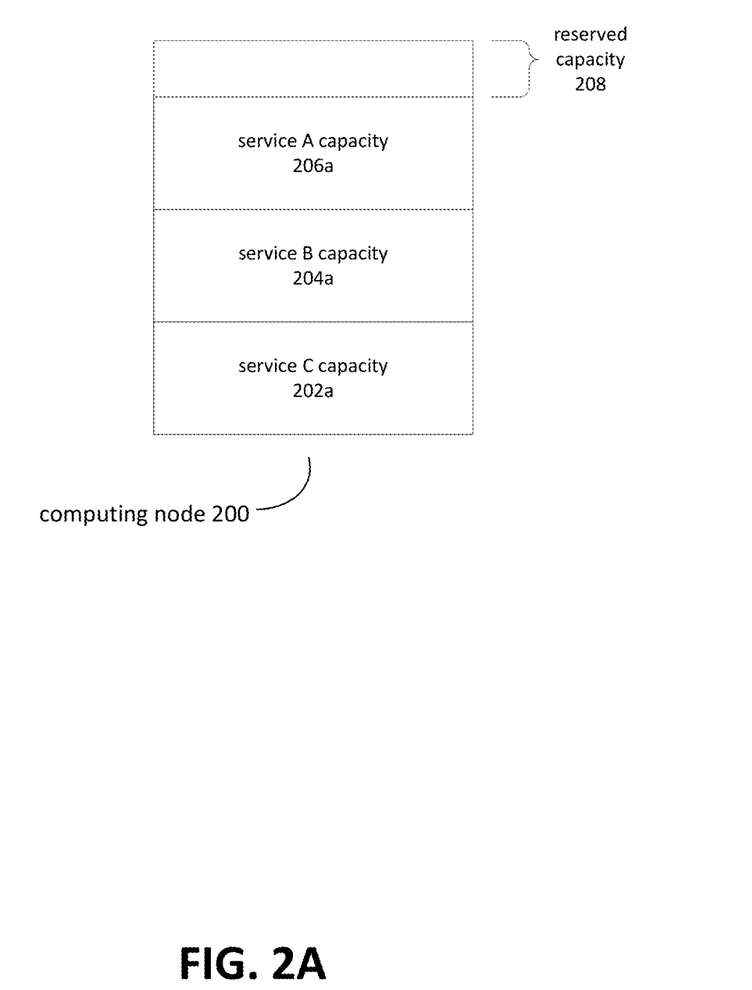
FIG. 2A is a diagram depicting an embodiment of an equal allocation of computing capacity among hosted services.

One provisioning approach is depicted by FIG. 2A. Each service is allocated a share of the total available capacity of computing node 200, 202a, 204a and 206a. An additional amount of capacity 208 may be reserved for performing maintenance, diagnostic, administrative or other functions, and not directly utilized for processing incoming requests.

Based on the partitioning of capacity, the throttling mechanism may be configured to reject a request if doing so would cause the service to exceed the capacity allocated to it. In an embodiment, the token method depicted in FIG. 1 may be employed. If so, each service may accumulate tokens at an equal rate. When a service is invoked on behalf of a customer, the request may be accepted and processed if a sufficient quantity of tokens is available in that service's pool of tokens. The tokens may then be removed from the pool and the request may be admitted.

If the tokens are representative of the utilized capacity of the pool, utilization of capacity may effectively mirror the utilization depicted in FIG. 2A, because tokens are allocated to each service at the same rate. This approach prevents the service allocated capacity 206a from encroaching on the other services, whose capacity is depicted by 202a and 204a. However, it may be that the service's allocated capacity 202a and 204a are relatively inactive. If so, the total capacity of computing node 200 will be underutilized.

Figure 2B:
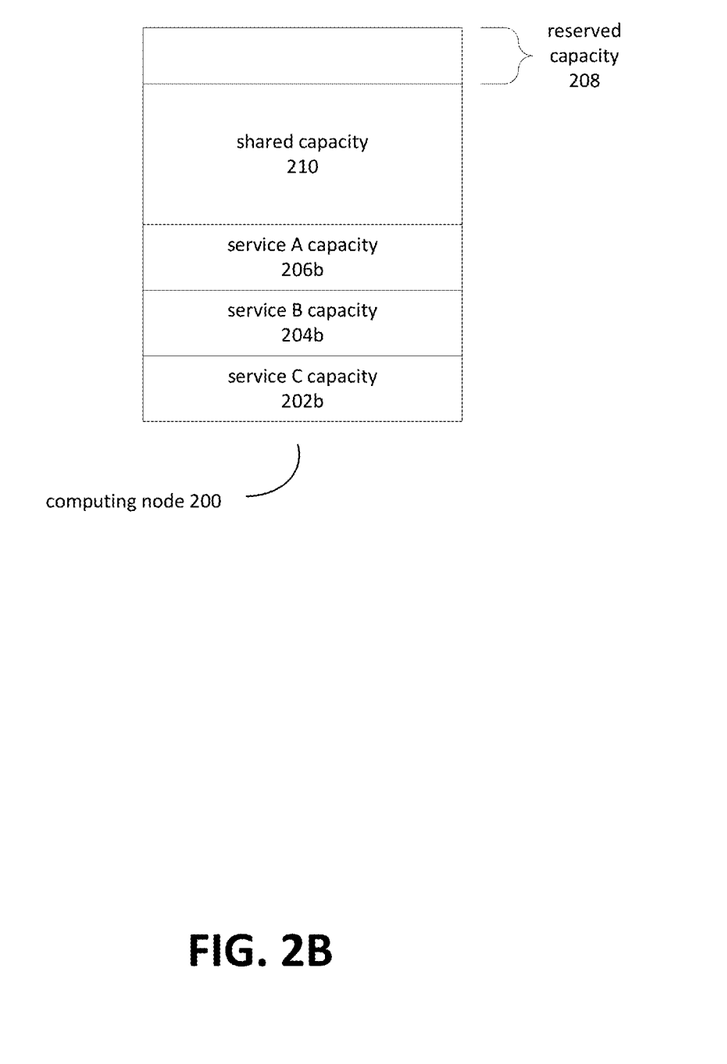
FIG. 2B is a diagram depicting an embodiment for an equal allocation of computing capacity among hosted services, accompanied by an allocated amount of shared capacity.

Another example of a provisioning scheme is depicted in FIG. 2B. Each service may be allocated a share of capacity 202b, 204b and 206b, which is somewhat less than the corresponding capacities 202a, 204a and 206a in FIG. 2A. As in FIG. 2A, reserved capacity 208 may also be allocated for performing various maintenance, diagnostic or administrative tasks. In addition, shared capacity 210 may be provided for the use of all of the services hosted on computing node 200. In conjunction with the token-based approach depicted in FIG. 1, this may be done by maintaining a separate pool of tokens which may be expended by invoking any service hosted on computing node 200. For example, if no tokens are available corresponding to service A's capacity 206b, tokens corresponding to shared capacity 210 may instead be expended to admit a request for service A. In some cases, there may be insufficient remaining tokens in the pool corresponding to shared capacity 210 to prevent requests from being rejected when, for example, capacity 202b or 204b is exceeded.

A benefit of using the shared capacity approach depicted in FIG. 2B is that a greater proportion of the capacity of computing node 200 may be utilized compared to the approach depicted in FIG. 2A. However, greater utilization of the computing node's capacity is associated with a greater risk of reducing request latency. If the reduction is excessive, the hosting provider may violate the service-level agreements it has with its customers. One approach to minimizing this risk is to carefully assess the capacity of the computing node and to maximize the degree to which the tokens accurately reflect utilization of capacity. However, such measures may be unable to completely eliminate the problems associated with overutilization and underutilization. Accordingly, further mechanisms for controlling utilization of the computing node may be advantageous. Furthermore, it may be beneficial for such a control mechanism to reflect latency measurements in addition to or instead of other metrics.

Numerous various of the allocation schemes depicted in FIG. 2A and FIG. 2B are consistent with embodiments of the present disclosure. For example, a pool of tokens may be allocated to various logical entities such as customers, services, request types and so forth. The admittance policy may attempt to withdraw from a corresponding pool and admit requests when the required quantity of tokens is available. In various embodiments, the capacities assigned to each entity may be proportionate or disproportionate to the capacities assigned to other entities.

An initial capacity may be determined based on experimental measures, such as stress, load or performance testing. One approach involves utilizing a test suite comprising various programming modules that exercise the hosted services at various workload levels. Various measurements, such as the latency of operations, input/output performance, CPU utilization and so forth may be collected and analyzed to determine an initial capacity assessment. Commercially available stress, load or performance testing applications may also be employed in assessing an initial capacity.

In an embodiment, measurements are collected for services during use of the services in a live production environment. These measurements may be collected on a short-term or ad hoc basis, or they may be collected over a longer period of time. Using these measurements for making an initial assessment may be advantageous because test suites may not accurately simulate performance of the live production environment. However, in some cases these measurements may nevertheless be inaccurate because of interplay with other services that may be operating in the same computing environment.

The results of the initial testing process may be reflected in the rate at which new tokens are added to the pools of available tokens. In other words, the token generation rate may be set so that at a steady state—when tokens leave the pool at the same rate they are added—the determined capacity of the system is not exceeded.

Figure 3:
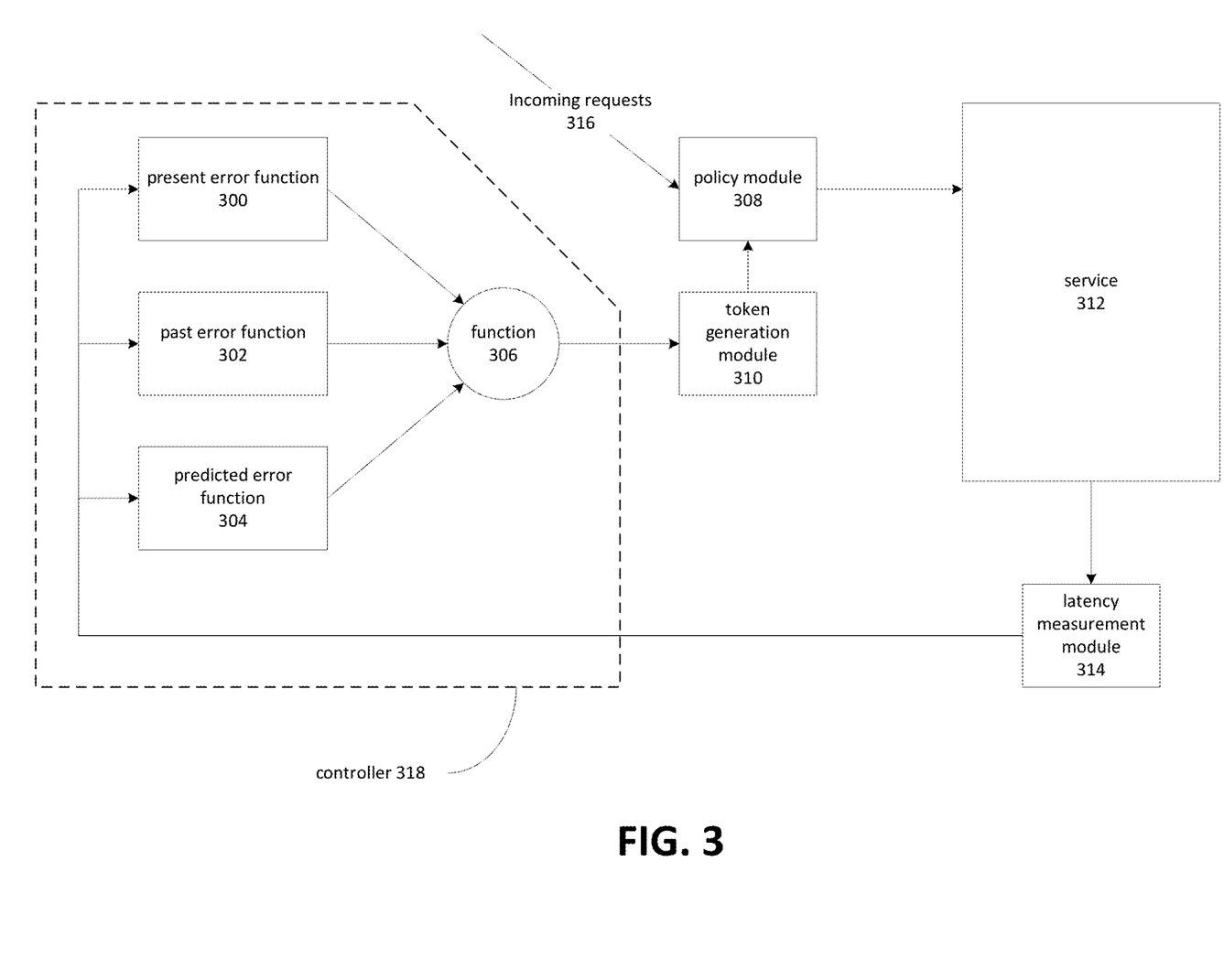
FIG. 3 is a block diagram depicting an embodiment for controlling latency and capacity utilization of services hosted on one or more computing nodes, using an admit or reject policy based on token generation and a controller adjusting the rate of token generation.

After being set initially, the rate of token generation may then be adjusted based at least in part on measured latency values. As noted previously, the rate of token generation acts to influence the admittance rate. FIG. 3 depicts an embodiment of a controller for adjusting the rate of token generation. Incoming requests are admitted or rejected by the actions of policy module 308, which may allow the request to be processed by a service 312 hosted on one or more computing nodes. Service 312 may comprise various computing functions performed on behalf of a client and associated with various metrics such as latency measurements.

Although depicted as a distinct entity in FIG. 3, policy module 312 is intended to be illustrative of executable code, circuitry and the like for determining whether incoming request 316 should be admitted or rejected. Accordingly, policy module 312 may operate at various architectural levels. For example, policy module 308 may be integrated into a request router, gateway, web service and so forth. Policy module 312 may also apply to different entities. Embodiments may, for example, determine request admittance on a customer basis, service basis and so forth. A different policy might apply to each service operating on a computing node. For distributed databases, request admittance may operate on a per-table basis, per-partition basis and so on. Policy module 312 may also operate on more than one architectural level and more than one entity.

Policy module 308 may be driven by configuration information describing the applicable policies. The configuration information may be associated with the entity to which it applies. For example, policies might be applied on a per-table or per-partition basis, in which case configuration information associated with the applicable policies could be stored in a catalog of database metadata. The configuration of policy module 308 may also be driven dynamically, for example in response to a customer request to temporarily or permanently change aspects of the policy such as provisioned capacity.

Latency measurement module 314 may collect information regarding the latency of processing incoming requests 316. Latency may, for example, be measured as the time between a web service hosted on one of the computing nodes 312 receiving a request and the time the web service returns a response. Various other measurement points are possible. Measurements could be made, for example, at points in the path of execution that would include the time spent admitting or rejecting a request at policy module 308. Alternatively, the latency for a critical path of execution performed while processing the request could be measured.

Output from latency measurement module 314 may be input to a controller 318, which may, for example, operate in a manner similar to a proportional-integrative-derivative ("PID") controller. A PID controller involves a control loop incorporating a feedback mechanism, and operates based on output of a function of a present error, a history of past errors and a prediction of future errors. FIG. 3 depicts a similar arrangement. Output from latency measurement module 314 may be supplied as input to present error function 300, past error function 302 and predicted error function 304. Another function 306, operates on the output of functions 300, 302, and 304 to supply input to token generation module 310. Function 306 may perform various operations such as summation, weighted averaging, and many other variations. Function 306 may comprise executable code that performs calculations, applies rule-based reasoning and so forth.

Token generation module 310 may use the supplied input to adjust the rate of token generation and thereby influence the admittance rate. In one non-limiting example, the input to token generation module 310 might comprise a numerical value from 0.5 to 1.5. This value might be multiplied with the current rate to produce a new rate that is between 50% less than to 50% greater than the current value.

In an embodiment, the adjustment rate is applicable to all services on a particular node or set of nodes. For example, a particular computing node might host two services, one of which accumulates tokens at the rate of 10 per second and the other at 6 per second. If the rate adjustment is indicated as 1.5, the new rate can be adjusted to 15 per second for the first service and 9 per second for the second.

In another embodiment, adjustment rates may be supplied on a per-service basis. This may be advantageous for situations when, for example, a particular service is over-utilizing its provisioned capacity. Another possible advantage is that the adjustment value supplied to token generation module 310 may be based on measured latency values specific to the service whose rate is being adjusted.

Figure 4:
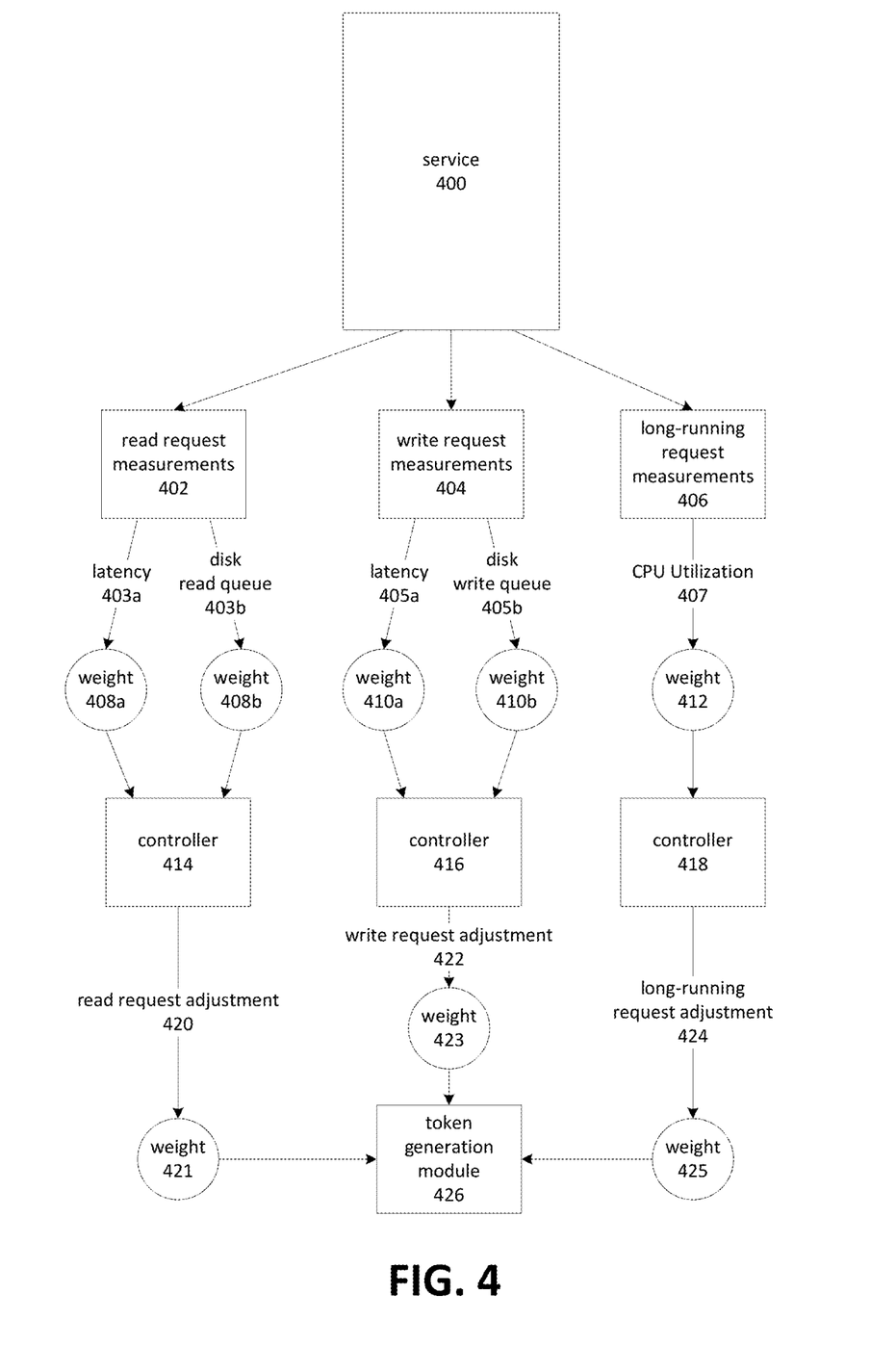
FIG. 4 is a block diagram depicting an embodiment for controlling the latency and capacity utilization of a service hosted on one or more computing nodes, using weighted metrics input to multiple controllers classified by a service request type.

It may also be advantageous to base adjustments on the type of requests involved. FIG. 4, for example, depicts an embodiment that adjusts token generation rates based on a classification of a request to perform an operation involving service 400. This approach may allow for greater precision in adjusting the token generation rate. For example, requests to read data might involve different performance and latency characteristics than requests to write data. It might be expected, for example, that a write request would normally have a higher latency value than a read request. Accordingly, it might be disadvantageous to reduce a token generation rate based on latency measurements recorded from longer-running write requests.

FIG. 4 also depicts using measurements in addition to latency. The importance of these values may also vary according to the type of request involved. For example, for requests to read data, a performance metric indicative of the wait time for disk reads may prove more reflective of current capacity utilization than a performance metrics that reflects the wait to write data. Similarly, for some types of requests latency may not be a preferred metric. For example, some requests might be known to take a very long time. It could be disadvantageous to use latency measurements in such cases, but alternative metrics such as average CPU utilization might prove more useful. Many alternative embodiments are possible, and a wide variety of diagnostic, capacity, utilization and performance measurements might be employed in various combinations.

Read request measurements 402 may be collected from one or more computing nodes operating service 400. The output may include, for example, latency 403*a* and disk read queue length 403*b*. These values might be weighted based on relative importance using weights 408*a* and 408*b*, and supplied as input to controller 414. Similarly, write request measurements 404 may include latency 405*a* and disk write queue length 405*b*, adjusted by weights 410*a* and 410*b* and supplied as input to controller 416. Long running requests measurements 406 might exclude a latency measurement but include other metrics, such as average CPU utilization 407, to which weight 412 may be applied.

FIG. 4 depicts different sets of measurements being collected based on a classification of a request performed by service 400. Classifying a request might comprise determining a type or category of the request, such as read, write, query, scan and so forth. Request classification may also involve analysis or partial evaluation of the request, which may include determining an expected path of execution for the request or a determination that the request will result in an error condition. In addition to influencing the types of measurements recorded, request classification may also be used as part of determining expected values for these measurements, for in controllers 414, 416, and 418.

The output of controllers 414, 416 and 418 might be supplied as input to token generation module 426 and used to adjust the rate of token generation. The token generation rate may be adjusted by multiplying the current rate by read request adjustment 420, write request adjustment 422 and long-running request adjustment 424. These values may also be adjusted by weights 421, 423 and 425, respectively.

In an embodiment, a separate accumulation rate value is kept for each type of request. Token generation module 426 may adjust each value individually based on read request adjustment 420, write request adjustment 422 and long-running request adjustment 424. The resulting values may be added to a combined pool of tokens, or to pools divided based on request type. This approach may be advantageous when certain types of requests are seen as involving a higher degree of risk. A separate pool may prevent higher-risk request types from being executed with greater frequency based on adjustment made for the other request types.

Figure 5:
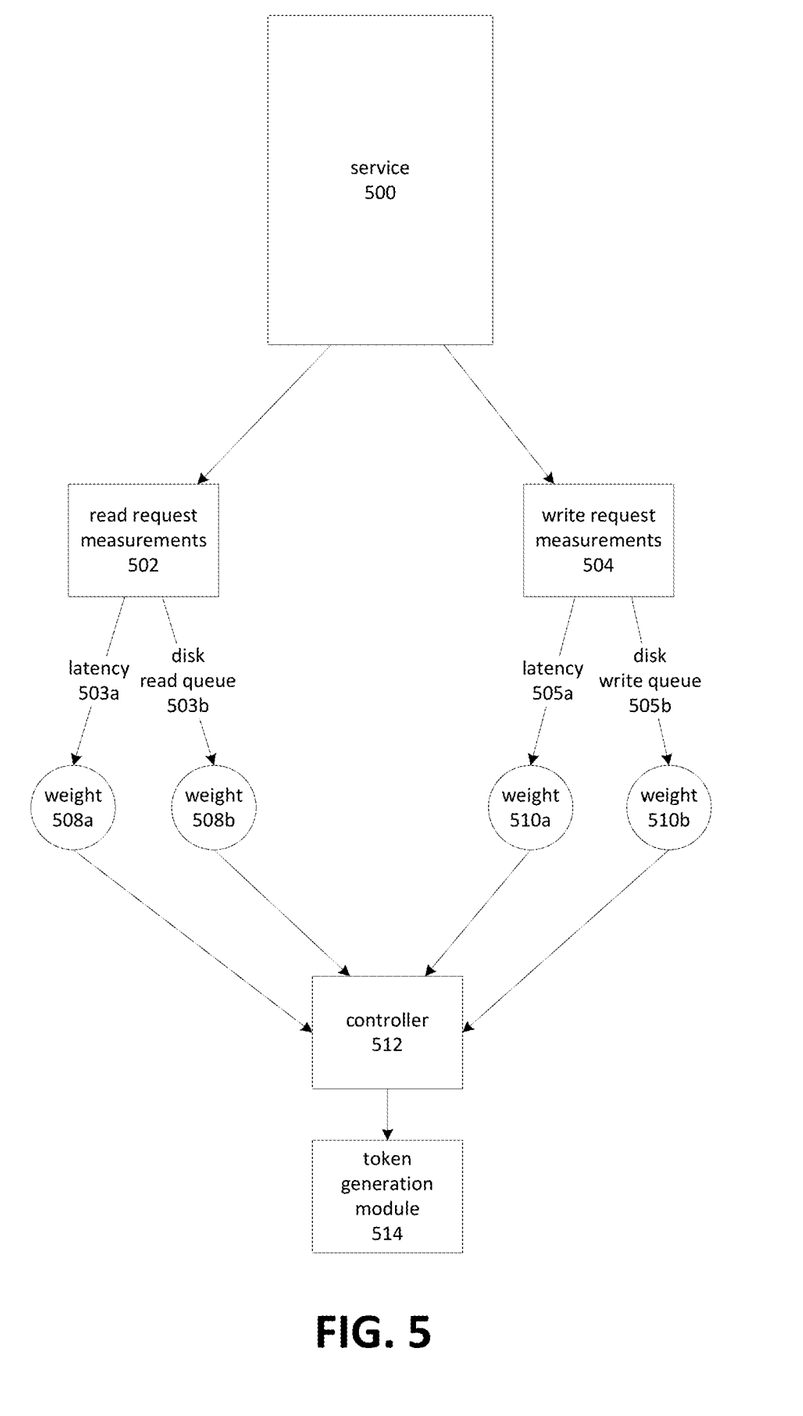
FIG. 5 is a block diagram depicting an embodiment for controlling the latency and capacity utilization of a service hosted on one or more computing nodes, using metrics weighted according to request type and input into a single controller.

In another embodiment, a multivariate controller may be employed to control the token generation rate. FIG. 5 depicts such an embodiment. Read request measurements 502 and write request measurements 504 may be collected for read requests and write requests, respectively, performed using service 500. The use of read and write requests in the depicted embodiment is intended to illustrate a general concept of classifying requests and operations performed by service 500 into types of operations that may be separately weighted prior to input to the controller which, in the embodiment depicted in FIG. 5, is a multivariate controller. The classification of operations into types may be based on various criteria, which may include the average degree of latency involved, measurements pertaining to that operation type that are predictive of an effect on latency, capacity, utilization and so forth, or other factors.

The techniques disclosed herein may be applicable to processing requests applicable to a key-value database management system. In such systems, it may be advantageous to classify requests according to the following types. These types include scan operations, queries, read operations and write operations. Full table scans may be slow an heavily dependent on input/output measurements, while scans of in-memory indexes may be bound by CPU. Read operations may have relatively low latency compared to write operations. Queries may involve numerous subcomponents. If so, it may be advantageous to dynamically classify the query according to its complexity, so that an appropriate estimated degree of latency can be determined for the query. The estimated degree of latency can be used to calculate the current difference between an actual and desired latency value for the query. Similar techniques may be applied to other measurement types, such an those indicative of input/output load.

In an embodiment, operations on a key-value database may be classified according to the locality of the required data, because operations spanning computing nodes may have greater latency than operations that may be performed on a single computing node. This principle may be applied to other service types that have the potential to span multiple computing nodes, remote networks and so forth. It may be advantageous to classify operations based on a grouping indicative of the expected or desired latency for the operations.

The metrics collected for a given request type may be weighted based on a variety of factors. One factor that might be applied is the relative frequency with which the corresponding operation is invoked. For example, the metrics latency 503*a* and disk read queue 503*b*, which correspond to read requests, might be weighted more heavily than the metrics latency 505*a* and disk write queue 505*b*, which correspond to write requests, if the frequency of read requests outnumbers that of write requests.

Metrics may also be weighted by their relative importance. For example, because latency may be particularly important due to concerns regarding the potential violation of service-level agreements, latency 503*a* might be weighted more heavily by weight 508*a* than disk read queue 503*b* is weighted by 508*b*. However, tuning of the controller may involve adjustments based on additional factors. Weight values may be based on testing, experimentation, observation, trial and error and so forth. In some cases, metrics other than latency may be given the most weight. For example, the controller 512 input resulting from latency 505*a* may be reduced by weight 510*a* while disk write queue length 505*b* is increased by weight 510*b*.

Controller 512 may be configured, with respect to each input metric, to incorporate a current error, a history of past errors and a prediction of future errors. In the present context, the term error may be interpreted as deviation from a desired value. Accordingly, one error value might be the difference between measured latency 503*a* and a desired value for read request latency, while another error value might be the difference between latency 505*a* and a desired write request latency. The desired value may reflect service-level agreements, possibly incorporating a margin of error. The desired value might also be based on testing, experimentation, observation, trial and error and so forth.

Controller 512 may be configured with respect to the weighting of a history of past errors and to the length of the incorporated history. In general terms, the history may be viewed as a moving average with an associated window. It may be advantageous to incorporate a short window if a more elastic response is desired or longer windows when less elasticity is preferred. The moving average may be a weighted moving average, such as an exponential moving average. Embodiments may also use various other adaptive control and predictive modeling techniques, such as neural networks.

The output of controller 512 may also be reflective of predicted future error, which may be expressed as expected future deviations from the desired value. In an embodiment, predictions of future error may be improved by a determination based in part on the type of error being predicted. For example, request latency may not increase in linear fashion. For example, a computing node hosting various services may experience steadily increasing workload. As its workload increases, latency may not be significantly affected until the demands placed upon the system reach a threshold level. At that point, latency may increase dramatically. Accordingly, the predicted rate of change might involve first calculating a rate of change using a derivative function, and then applying a square or step function to the derivative. Similar approaches may apply to other metrics. Certain metrics, such as CPU utilization, may be constrained to a range which might be reflected in the predicted error calculation. Improved predicted error values may be incorporated into a feedback loop that may be associated with controller 512.

The output of controller 512 may also be fed to token generation module 514. The output may cause the rate of token generation to increase or decrease, and accordingly the rate at which new requests are admitted may increase or decrease in corresponding fashion.

Figure 6:
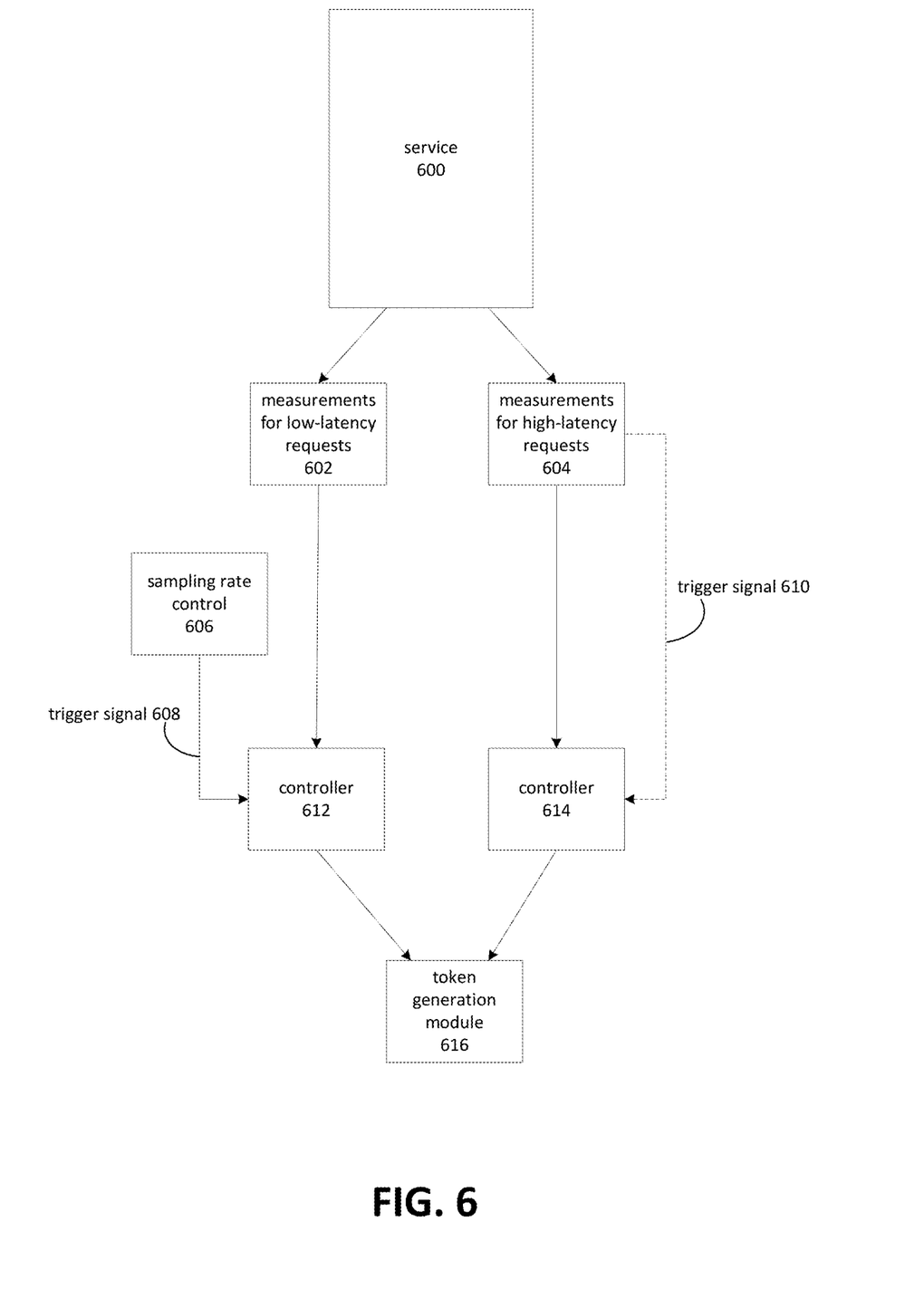
FIG. 6 is a block diagram depicting an embodiment for determining the sampling rate of input supplied to controllers.

The frequency of sampling and adjustment may be tuned to improve the performance and stability of the controllers. FIG. 6 depicts an embodiment for controlling sampling rates for two controllers 612 and 614. Service 600 may operate on a computing node, processing various requests on behalf of customers. The requests may be divided into various categories, such as low latency requests and high latency requests. Latency measurements and other pieces of diagnostic, performance, capacity or utilization information may be collected, as depicted by low-latency measurements 602 and high-latency measurements 604. These measurements may be supplied as input to the controller at a sampling rate determined based on a variety of factors. In some embodiments, the stability of controller 612 or 614 may be affected by sampling rates that are suboptimal. At the same time, it may be advantageous to minimize the number of samples accepted by the controllers for various reasons, such as reducing the number of computations.

Sampling rate control 606 may utilize a number of operating principles. In one embodiment, sampling rate control 606 triggers sampling by the controller 612 at a selected frequency. It may be advantageous to select a frequency that is relatively high compared to the expected latency of the requests being processed. Some embodiments may set the sampling rate to approximate the average rate at which requests are processed. Other may set the sampling rate based on an estimated or measured rate of range for various measurements, such as latency. However, if the rate is too low, multiple or numerous requests may be processed without allowing adjustment of the token generation rate. In addition, some controllers may be unstable if the sampling rate is too low relative to the rate of potential change in the controlled system. In the depicted embodiment, if the latency of requests processed by service 600 changes rapidly compared to the sampling rate controlled by 606, controller 612 may overcompensate and cause excessive overutilization or underutilization.

Sampling rate control 606 may send a trigger signal 608 at a periodic interval, determined by the sampling frequency, to indicate to controller 612 that it should collect a sample. The resulting adjustment factor can then be supplied as input to the token generation module.

Requests with comparatively high latency may be processed by service 600. In some embodiments, the associated controller 614 may be driven using a sampling mechanism similar or identical to that applied to low-latency requests, for example using sampling rate control 606. However, in some embodiments an alternative sampling control mechanism might be employed. In one embodiment, measurements for high-latency requests may be collected as each request is processed. A trigger signal 610 may then be sent to controller 614, so that the newly collected measurement may be utilized by controller 614 to generate a new adjustment factor, which may then be supplied to token generation module 616.

In an embodiment, the rate of token generation may be influenced in one direction or another based on the occurrence of an event. For example, in a distributed computing environment, such as a distributed key-value database management system, a computing node may be required to provide additional capacity in the event of a failover. When such an event occurs, the rate of token generation may be adjusted. This may be done by altering the weights of the controller, resetting token regeneration values and so forth.

Figure 7:
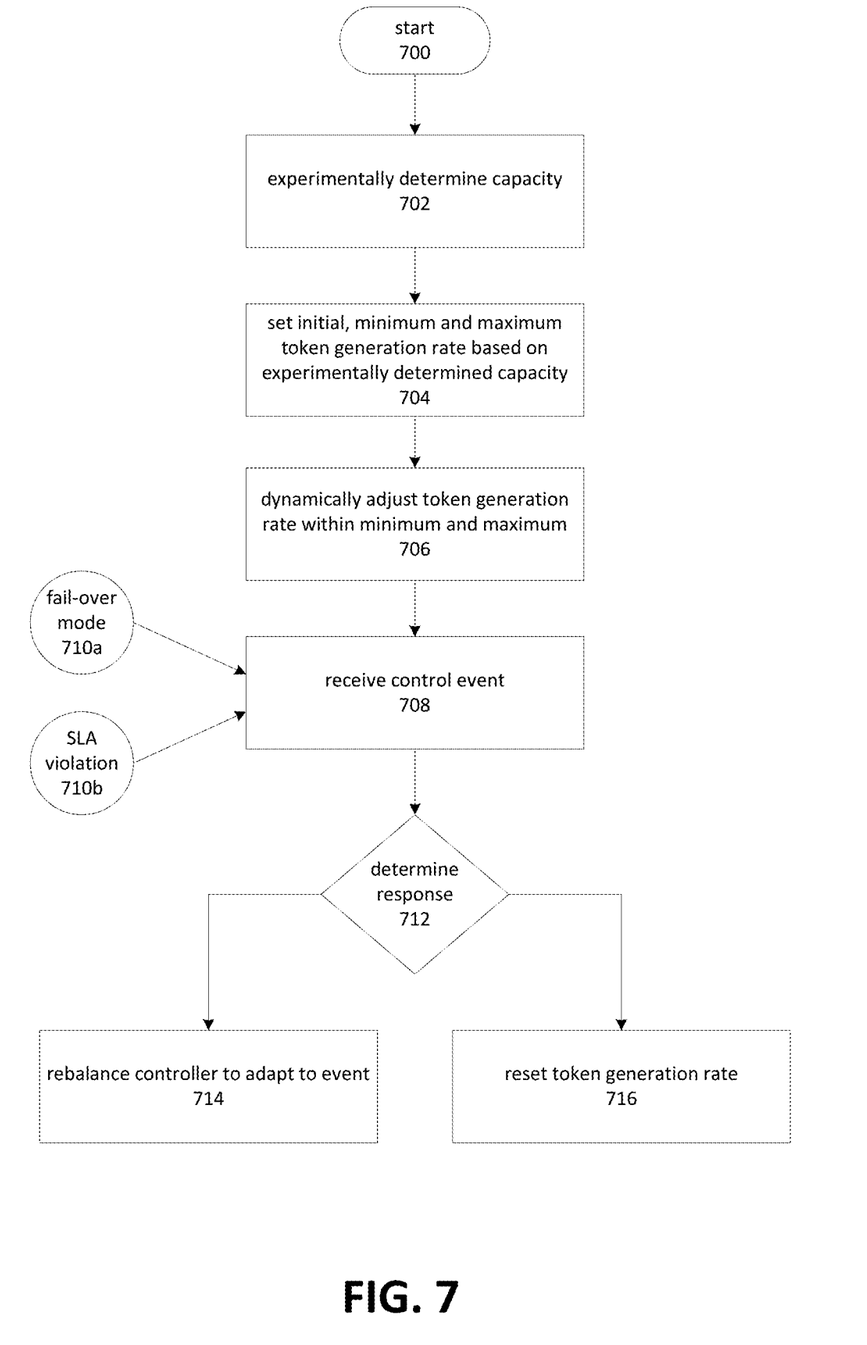
FIG. 7 is a block diagram depicting an embodiment for overriding a current token generation rate based on a controlling event.

FIG. 7 depicts one example of an embodiment for responding to various event types. Although depicted as a sequence of operations starting with operation 700, those of ordinary skill in the art will appreciate that the depicted operations are illustrative in nature. As such, they are not intended to limit the scope of the present disclosure. In particular, some of the depicted operations may be modified, combined, omitted, reordered or performed in parallel.

At operation 702, the initial capacity of the machine is determined based on one or more approaches such as experimental data, test suites, trial and error, observation and so forth. Embodiments may also determine an initial capacity based on manufacturer's specifications, a count of the number of available CPU's, available memory and so forth. Embodiments may be able to obtain this data from an operation system, basic input/output system and so forth. Capacity may also be based on a model of capacity accepting metrics such as these as input. Based at least in part on the determined capacity, initial, minimum and maximum token generation rates may be determined at operation 704. Regarding the minimum token generation rate, it may be advantageous to limit the ability of the controller to reduce token generation below a threshold value, and in particular to prevent the rate from approaching or equaling zero, in most cases. If token regeneration is allowed to approach or equal zero, no more requests may be processed after the current pool of tokens has been exhausted. Regarding the maximum rate, it may be advantageous to prevent token generation from rising above a threshold value. This value may be based, for example, on the corresponding customer's service tier. It may also be advantageous to impose a maximum based on reserving capacity or handling a potentially destabilized controller. Such an approach may help prevent the controller, in various edge cases, from allowing unlimited token generation.

At operation 706, token generation may be dynamically adjusted using various aspects of the present disclosure. A controller utilizing weighted latency values and other metrics may act to dynamically adjust the rate of token generation, which in turn controls the rate at which service requests are accepted for processing and the degree to which the capacity of the computing nodes is utilized.

The operation of the controller may improve capacity utilization while ensuring that service-level agreements, such as those involving request latency, are adhered to. However, certain events may indicate that the rate of token generation should be readjusted based on some other factor.

Operation 708 depicts receiving a control event, which may indicate that the current rate of token generation, as set by the controller, should be overridden. Other events may indicate that aspects of the controller's operation should be adjusted. An event might for example indicate that the weights assigned to certain metrics or the sampling frequency should be adjusted.

Event 710a may indicate that one or more computing nodes are entering failover mode. When this mode is entered, a computing node may have been shut down for maintenance or failed suddenly. When this occurs, load processed by that computing node may be shifted to other nodes. These nodes may in turn experience increased workload.

When a failover event occurs, it may be advantageous to reset the current token generation rate to a threshold value. In an embodiment, the value may be based on an expected increased workload. For example, FIG. 2A depicts reserved capacity 208. The new value may reflect a decision to utilize this reserved capacity in the event of failover. Once reset, the controller may operate as normal. In some embodiments, the configuration of the controller or controllers used in the system may be reconfigured to reflect a new distribution of workload. When the failover occurs, the requests formerly processed by the failed computing node may have different characteristics, including latency characteristics.

Operation 712 depicts determining the desired response to the received event. In response to the fail-over mode event 710a, the controller weights might be rebalanced as depicted by operation 714, or the current token regeneration rate might be reset at operation 716.

Another possible event type is a service-level agreement violation, 710b. This event may occur, for example, when latency figures for a given service are worse than the agreed-upon level. When this occurs, it may be advantageous to adjust the weights of one or more controllers used by the system. For example, each service might be associated with a corresponding token generation rate. When a particular service is in violation of an SLA, the weights of its controller might be adjusted to favor an increased token generation rate for that service, while the controllers used to adjust the token regeneration rate of other services might be adjusted to favor a decreased token generation rate.

Figure 8:
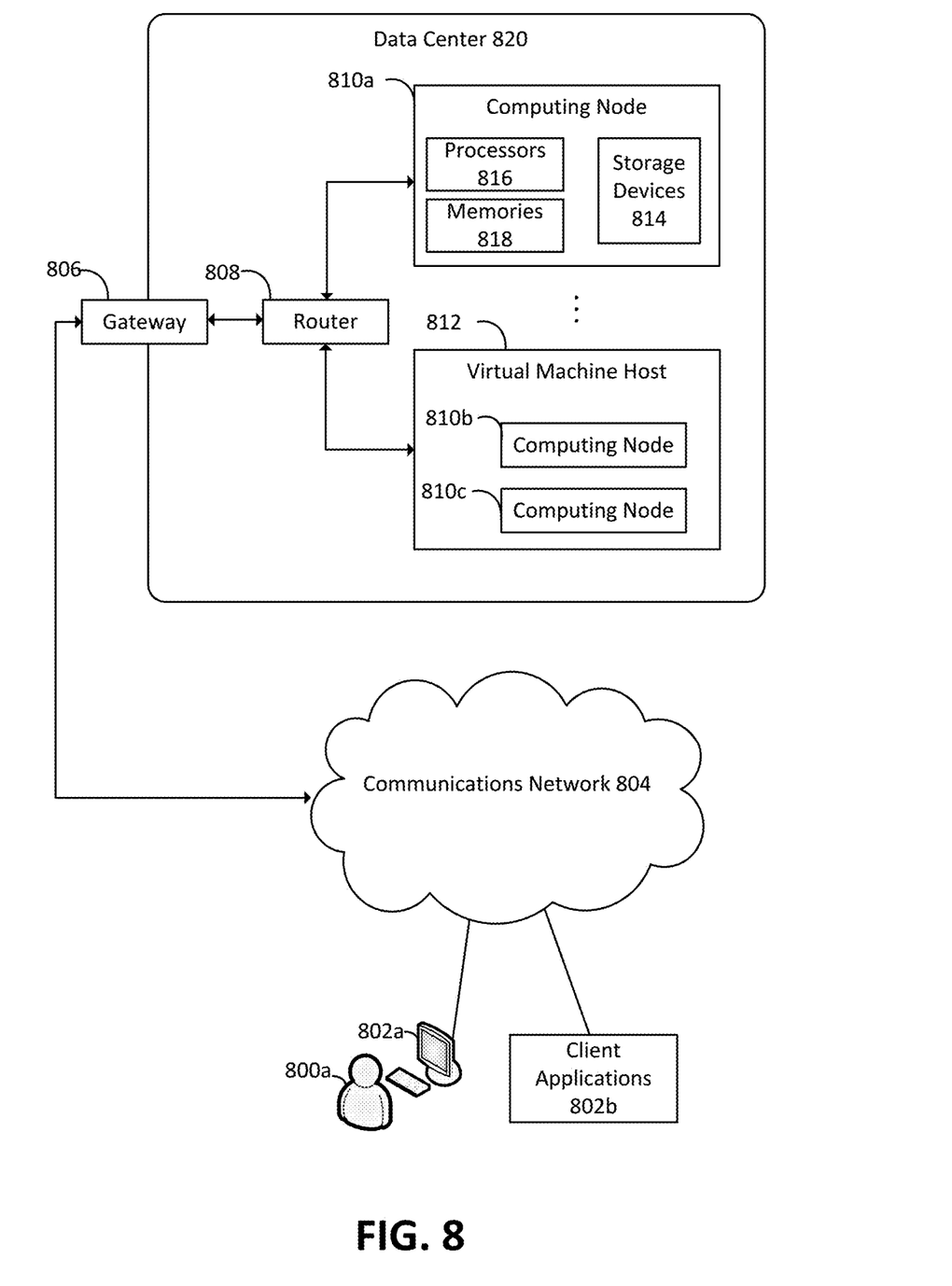
FIG. 8 is a block diagram depicting an embodiment of a computing environment in which aspects of the present disclosure may be practiced.

FIG. 8 is a diagram depicting an example of a distributed computing environment on which aspects of the present invention may be practiced. Various users 800a may interact with various client applications, operating on any type of computing device 802a, to communicate over communications network 804 with processes executing on various computing nodes 810a, 810b and 810c within a data center 820. Alternatively, client applications 802b may communicate without user intervention. Communications network 804 may comprise any combination of communications technology, including the Internet, wired and wireless local area networks, fiber optic networks, satellite communications and so forth. Any number of networking protocols may be employed.

Communication with processes executing on the computing nodes 810a, 810b and 810c, operating within data center 820, may be provided via gateway 806 and router 808. Numerous other network configurations may also be employed. Although not depicted in FIG. 8, various authentication mechanisms, web service layers, business objects or other intermediate layers may be provided to mediate communication with the processes executing on computing nodes 810a, 810b and 810c. Some of these intermediate layers may themselves comprise processes executing on one or more of the computing nodes. Computing nodes 810a, 810b and 810c, and processes executing thereon, may also communicate with each other via router 808. Alternatively, separate communication paths may be employed. In some embodiments, data center 820 may be configured to communicate with additional data centers, such that the computing nodes and processes executing thereon may communicate with computing nodes and processes operating within other data centers.

Computing node 810a is depicted as residing on physical hardware comprising one or more processors 816, one or more memories 818 and one or more storage devices 814. Processes on computing node 810a may execute in conjunction with an operating system or alternatively may execute as a bare-metal process that directly interacts with physical resources such as processors 816, memories 818 or storage devices 814.

Computing nodes 810b and 810c are depicted as operating on virtual machine host 812, which may provide shared access to various physical resources such as physical processors, memory and storage devices. Any number of virtualization mechanisms might be employed to host the computing nodes.

The various computing nodes depicted in FIG. 8 may be configured to host web services, database management systems, business objects, monitoring and diagnostic facilities, and so forth. A computing node may refer to various types of computing resources, such as personal computers, servers, clustered computing devices and so forth. When implemented in hardware form, computing nodes are generally associated with one or more memories configured to store computer-readable instructions, and one or more processors configured to read and execute the instructions. A hardware-based computing node may also comprise one or more storage devices, network interfaces, communications buses, user interface devices and so forth. Computing nodes also encompass virtualized computing resources, such as virtual machines implemented with or without a hypervisor, virtualized bare-metal environments, and so forth. A virtualization-based computing node made have virtualized access to hardware resources, as well as non-virtualized access. The computing node may be configured to execute an operating system, as well as one or more application programs. In some embodiments, a computing node might also comprise bare-metal application programs.

Each of the processes, methods and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions of thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system for influencing latency characteristics of one or more hosted services by controlling an admittance rate, the system comprising:
    one or more computing nodes hosting at least a first service, the one or more computing nodes comprising a first capacity for processing requests directed to the first service; and
    one or more memories comprising computer-readable instructions that, upon execution by a computing device, cause the system at least to:
        admit a first request, based at least in part on a first rate value for the admittance rate, the first rate value based at least in part on the first capacity;
        determine an elapsed time for processing the first request;
        calculate a latency error value for the processing of the first request based at least in part on a difference between the elapsed time for processing the first request and a target elapsed time for processing the first request, the target elapsed time based at least in part on a classification of the first request;
        adjust the admittance rate to a second rate value, wherein the second rate value is based at least in part on an output of a computation utilizing, as input, the first rate value, the latency error value, a history of latency error values, and a prediction of future latency error values; and
        admit a second request based at least in part on the adjusted admittance rate.

2. The system of claim 1, wherein the one or more memories comprising computer-readable instructions that, upon execution by a computing device, cause the system at least to:
    calculate the second rate value based at least in part on one or more metrics associated with processing the first request, the one or more metrics weighted with respect to the latency error value.

3. The system of claim 1, wherein the one or more memories comprising computer-readable instructions that, upon execution by a computing device, cause the system at least to:
    calculate the first rate value based at least in part on a rate at which tokens are added to a pool of tokens, wherein at least one token is removed from the pool of tokens when a request is processed.

4. A method for influencing request latency characteristics by controlling an admittance rate, the method comprising:

admitting a first request to perform a first operation, the admitting based at least in part on a first rate value for the admittance rate;
determining an elapsed time for performing the first operation;
calculating a present error based at least in part on a difference between the elapsed time for processing the first request and a target elapsed time for processing the first request;
calculating a second rate value based at least in part on an output of a computation utilizing the first rate value, the present error, a historical error, and a predicted error; and
admitting a second request to perform a second operation based at least in part on the second rate value.

5. The method of claim 4, further comprising:
determining one or more metrics associated with performing the first operation; and
calculating the present error based at least in part on the one or more metrics, the one or more metrics weighted with respect to the elapsed time.

6. The method of claim 4, wherein the target elapsed time is based at least in part on a classification of the first request.

7. The method of claim 6, wherein the classification comprises one or more of a scan, query, read request, write request, error condition, and path of execution.

8. The method of claim 6, further comprising selecting a metric for collection based at least in part on the classification.

9. The method of claim 6, wherein the classification comprises a grouping based at least in part on a degree of latency.

10. The method of claim 4, further comprising calculating the historical error based at least in part on the present error.

11. The method of claim 4, further comprising determining the predicted error based at least in part on a rate of change calculated based at least in part on the present error.

12. The method of claim 4, wherein the second rate value is calculated based at least in part on a moving average of past errors.

13. The method of claim 4, further comprising overriding the second rate value by updating the admittance rate with one of a minimum value, maximum value, or predetermined value.

14. The method of claim 4, wherein the present error is calculated at a periodic interval.

15. The method of claim 4, wherein the admittance rate is a token generation rate.

16. A non-transitory computer-readable storage medium comprising instructions that, upon execution by a computing device, cause the computing device to at least:
admit a first request to perform a first operation, based at least in part on a first capacity utilization rate;
determine one or more metrics associated with processing the first request;
calculate a present error based at least in part on weighted differences between the one or more metrics and one or more corresponding desired metrics, the corresponding desired metrics based at least in part on a characterization of the first request;
determine a second capacity utilization rate based at least in part on a computation utilizing the first capacity utilization rate, the present error, and a predicted error; and
admit a second request to perform a second operation, based at least in part on the second capacity utilization rate.

17. The computer-readable storage medium of claim 16, wherein the characterization of the first operation is based at least in part on classifying the first operation as one of a scan, query, read request, write request, or update.

18. The computer-readable storage medium of claim 16, wherein at least one of the one or more metrics is a measure of latency.

19. The computer-readable storage medium of claim 16, wherein the characterization of the first operation is based at least in part on an average latency for operations similar to the first operation.

20. The computer-readable storage medium of claim 16, wherein the characterization of the first operation is based at least in part on one or more of a request type, partial evaluation, and error condition.

21. The computer-readable storage medium of claim 16, further comprising selecting the one or more metrics based at least in part on the characterization.

22. The computer-readable storage medium of claim 16, wherein the characterization of the first operation is based on values indicative of a target level of utilization of a computing node.

23. The computer-readable storage medium of claim 16, further comprising overriding the capacity utilization rate with one of a minimum, maximum, or predetermined value.

24. The computer-readable storage medium of claim 16, further comprising:
calculating a value indicative of a history of errors based at least in part on the present error; and
calculating a predicted future error, based at least in part on a rate of change value calculated based at least in part on the present error.

25. The computer-readable storage medium of claim 24, further comprising:
applying a secondary function to the predicted future error, the secondary function selected based at least in part on physical characteristics corresponding to the one or more metrics.

* * * * *